(12) United States Patent
Deshpande et al.

(10) Patent No.: US 11,746,677 B2
(45) Date of Patent: Sep. 5, 2023

(54) BEARING HOUSING AND METHOD OF MANUFACTURE

(71) Applicant: Cummins Ltd., London (GB)

(72) Inventors: Krishna Dheerendra Deshpande, Pune (IN); Vijay Sukhadev Chavan, Pune (IN)

(73) Assignee: CUMMINS LTD., London (GB)

( * ) Notice: Subject to any disclaimer, the term of this patent is extended or adjusted under 35 U.S.C. 154(b) by 9 days.

(21) Appl. No.: 17/631,369

(22) PCT Filed: Jul. 21, 2020

(86) PCT No.: PCT/EP2020/070576
§ 371 (c)(1),
(2) Date: Jan. 28, 2022

(87) PCT Pub. No.: WO2021/018673
PCT Pub. Date: Feb. 4, 2021

(65) Prior Publication Data
US 2022/0325634 A1 Oct. 13, 2022

(30) Foreign Application Priority Data
Jul. 29, 2019 (GB) ..................................... 1910815

(51) Int. Cl.
*F01D 25/24* (2006.01)
(52) U.S. Cl.
CPC ........ *F01D 25/243* (2013.01); *F05D 2220/40* (2013.01); *F05D 2260/39* (2013.01)
(58) Field of Classification Search
CPC ...... F01D 25/243; F01D 25/125; F01D 25/18; F01D 25/162; F05D 2220/40;
(Continued)

(56) References Cited

U.S. PATENT DOCUMENTS

2011/0171016 A1    7/2011 Claude
2019/0301366 A1*  10/2019 Weisbrod ................. F02C 6/12

FOREIGN PATENT DOCUMENTS

CN       101668927 A    3/2010
CN       101815853 A    8/2010
(Continued)

OTHER PUBLICATIONS

International Preliminary Report on Patentability received for PCT Patent Application No. PCT/EP2020/070576, dated Feb. 2, 2022, 10 pages.
(Continued)

*Primary Examiner* — Mickey H France
*Assistant Examiner* — Edward Bushard
(74) *Attorney, Agent, or Firm* — Faegre Drinker Biddle & Reath LLP

(57) ABSTRACT

There is disclosed a bearing housing for a turbocharger. The bearing housing comprises a body and a mounting flange. The body is configured to receive one or more bearings. The one or more bearings are configured to support rotation of a shaft about an axis. The mounting flange extends around the body. The mounting flange comprises a plurality of bores, a first face and a plurality of cavities. The plurality of bores configured to receive a fastener therethrough. The first face is configured to engage a corresponding mounting flange of a turbine housing. The plurality of cavities are in communication with the plurality of bores. The plurality of cavities are axially recessed relative to the first face.

18 Claims, 8 Drawing Sheets

(58) Field of Classification Search
CPC ........... F05D 2260/39; F05D 2260/231; F05D 2300/111; F05D 2300/131; F02B 39/005; F02B 39/00; F16C 2204/46; F16C 2220/02; F16C 2220/60; F16C 2220/66; F16C 2226/10; F16C 2226/60; F16C 33/6659; F16C 35/042; F16C 2360/24; B23P 15/003; F04D 29/056

See application file for complete search history.

(56) References Cited

FOREIGN PATENT DOCUMENTS

| CN | 101821481 A | 9/2010 |
| CN | 102127674 A | 7/2011 |
| CN | 104145099 A | 11/2014 |
| DE | 102016123249 | 6/2018 |
| GB | 722391 A | 1/1955 |
| GB | 0866709 A | 4/1961 |
| GB | 2435498 A | 8/2007 |
| JP | 59-010710 A | 1/1984 |
| JP | H07189723 A * | 7/1995 ............. F02B 39/00 |
| JP | H07189724 A | 7/1995 |
| WO | 2004/085800 A1 | 10/2004 |
| WO | 2013148412 A1 | 10/2013 |
| WO | 2014/105377 A1 | 7/2014 |
| WO | 2016/126623 A1 | 8/2016 |
| WO | 2019044776 A1 | 3/2019 |
| WO | 2019118698 A1 | 6/2019 |

OTHER PUBLICATIONS

International Search Report and Written Opinion received for PCT Patent Application No. PCT/EP2020/070576, dated Nov. 24, 2020, 13 pages.

International Search Report and Written Opinion for International patent application No. PCT/EP2020/070576 filed Jul. 21, 2020, dated Nov. 24, 2020.

* cited by examiner

| Water cooled bearing housing - Dry | | | | | |
|---|---|---|---|---|---|
| SSR Ratio | | SSR = (UCS/Min compressive stresses) | | SSR = UCS/Min compressive stress | |
| Design concept | | Baseline | | Concept C3_Hybrid_Secondary | |
| Material | | E4-01-132 | | E4-01-164 | |
| Region | | Open Hole area | Bolt Hole area | Open Hole area | Bolt Hole area |
| Toward outer side of flange | Turbine side | 0.58 | 0.65 | >1 | 0.86 |
| | Comp side | 0.71 | 0.68 | >1 | >1 |
| Toward Dome side | Turbine side | 0.74 | 0.83 | >1 | >1 |
| | Comp side | 0.92 | 0.86 | >1 | >1 |
| Max temperature | | | | | |
| Open Hole | | 577 | | 404 | |
| Bolt Hole | | 577 | | 419 | |
| Temperature limit | | 350/400°C | | 730°C | |
| Flange temperature | | Beyond material limit | | Within material limit | |
| Fatigue characteristics | | | | Improved thermal fatigue properties compared to grey cast iron | |
| Pictorial View | | | | | |

Figure 4

| Region | | Fatigue Life in Cycles | | % improvement |
|---|---|---|---|---|
| | | Without Slot Design | With Slot Design | |
| Open Hole Area | Towards outer Side of flange | 9 | 387 | 4200 |
| | Towards Dome Side | 46 | >1000 | 2074 |
| Bolt Hole Area | Towards outer Side of flange | 10 | 102 | 920 |
| | Towards Dome Side | 74 | 458 | 519 |
| Fillet area near Rib region | | NA | 51 | |

Figure 5

BEARING HOUSING AND METHOD OF MANUFACTURE

CROSS-REFERENCE TO RELATED APPLICATIONS

The present application claims priority to and is a national phase filing of PCT/EP2020/070576, filed Jul. 21, 2020, which claims priority to UK Application No. 1910815.8, filed on Jul. 29, 2019, the entire disclosures of which being hereby expressly incorporated herein by reference.

FIELD OF THE DISCLOSURE

The present disclosure relates to a bearing housing for a turbocharger. The present disclosure also relates to a turbocharger incorporating said bearing housing, and to a method of manufacturing the bearing housing.

BACKGROUND

Turbochargers are well known devices for supplying air to the intake of an internal combustion engine at pressures above atmospheric pressure (boost pressures). A conventional turbocharger comprises an exhaust gas driven turbine impeller mounted on a rotatable shaft within a turbine housing. Rotation of the turbine impeller rotates a compressor impeller mounted on the other end of the shaft within a compressor housing. The compressor impeller delivers compressed air to the intake manifold of the engine, thereby increasing engine power.

The turbocharger shaft is conventionally supported by journal and thrust bearings, including appropriate lubricating systems, located within a central bearing housing connected between the turbine housing and the compressor housing.

During operation, temperatures in the turbine housing may reach in excess of 1000° C. As a result of such high temperatures, components within the turbocharger, particularly the bearing housing, may fail prematurely. In particular, components in close proximity to the highest temperatures, i.e. near the turbine impeller and turbine housing, are more prone to failure.

It is one object of the present disclosure to overcome disadvantages associated with existing turbochargers.

SUMMARY

According to a first aspect of the disclosure there is provide a bearing housing for a turbocharger, the bearing housing comprising:
a. a body configured to receive one or more bearings, the one or more bearings being configured to support rotation of a shaft about an axis; and
b. a mounting flange, the mounting flange extending around the body and comprising:
i. a plurality of bores configured to receive a fastener therethrough;
ii. a first face configured to engage a corresponding mounting flange of a turbine housing; and
iii. a plurality of cavities in communication with the plurality of bores, the plurality of cavities being axially recessed relative to the first face.

The one or more bearings may include roller bearings and/or thrust bearings. The bearings may be inserted into the bearing housing using a press, or similar.

The mounting flange is preferably annular. That is to say, the mounting flange is shaped like a disc, with a central portion removed. The mounting flange may have an outer geometry which is substantially circular. Alternatively, the mounting flange may have an irregular outer geometry.

The mounting flange is preferably between around 5 mm and around 15 mm in thickness. More preferably, the mounting flange is around 9 mm thick. Thickness refers to the extent of material in the axial direction.

The mounting flange is preferably between around 15 cm and 20 cm in diameter. More preferably, the mounting flange is around 17 cm in diameter.

The mounting flange and body are preferably a uniform body. That is to say, the mounting flange and body may be created at the same time, by the same casting process. However, the mounting flange and body may, in some arrangements, be discrete bodies which are connected to one another during assembly of the turbocharger.

The mounting flange may provide alignment features which are used to align the turbine relative to the bearing housing. The alignment may be both axial and rotational.

The bores of the plurality of bores are preferably clearance bores. In preferred arrangements there are 16 bores. The bores may be any suitable diameter such as, for example, around 9 mm.

The first face may be a single face. Alternatively, the first face may be formed of a number of difference faces which lie in the same axial plane. The first face therefore defines an alignment face, which may comprise a number of individual features.

The engagement of the first face with the corresponding mounting flange of the turbine housing is typically direct abutment. That is to say, the first face typically contacts the corresponding mounting flange. However, in some instances there may not be direct contact, and there may instead be an interposing component. This component may be a shim, or some other spacing device. A heat shield is another component which may result in indirect engagement.

Engagement may be direct or indirect. Indirect engagement may refer to a further component being disposed between the mounting flanges. For example, a shim or other component, such as a heat shield, may interpose the mounting flanges.

The cavities may be recesses. The cavities may be said to provide a thermal break between the mounting flanges, or be configured to provide a thermal break between the mounting flanges. The cavities may alternatively be said to at least partially thermally decouple the mounting flanges.

The plurality of cavities being in communication with the plurality of bores may be interpreted as meaning that the bores are aligned with the cavities. That is to say, if a fastener was passed through the bores, the fastener would also pass through the cavities. For the purposes of this document, bores for receipt of fasteners are not considered to be cavities as defined in the claims.

The recessed nature of the cavities relative to the first face defines a second face. The second face is therefore axially offset from the first face. The first and second faces are on the turbine side of the mounting flange. The cavities are defined between the first and second faces. The plurality of cavities may be said to be directly recessed relative to the first face. That is to say, the cavities may define, at least in part, the first face. The plurality of cavities may be said to be formed in the first face.

The incorporation of the cavities is beneficial for a number of reasons.

Firstly, the cavities provide a thermal break between the comparatively hot turbine housing, and the cooler bearing housing, specifically mounting flange thereof, during turbocharger operation. This thermal break means that peak temperatures of the mounting flange are, during operation, reduced which, in turn, reduces thermal stresses induced in the mounting flange. The reduction of thermal stresses reduces the susceptibility of the bearing housing to failure by thermal fatigue, and reduces the likelihood of cracks forming, or propagating. In other words, the robustness of the bearing housing, specifically the mounting flange, is improved.

The cavities also reduce the loss of preload of bolts used to secure the bearing housing to the turbine housing. Preload loss is attributable to high temperature operation, wherein material surrounding the bolts expands and urges the bolts out of the threaded bores in which they are engaged. Preload loss gradually "loosens" the bolted joint, which can lead to catastrophic failure. Due to the cavities, preload loss in the bolts is reduced, at least in part due to the reduction in peak temperatures reached by the mounting flange during turbocharger operation.

Finally, the cavities do not unduly add material to the mounting flange, and therefore do not increase the weight of the bearing housing. Actually, the cavities reduce the amount of material present, and therefore reduce the weight of the bearing housing, and possibly the cost as a result thereof. In other words, the disclosure provides a more efficient use of material in the bearing housing, specifically the mounting flange, to improve thermal performance without increasing the material usage, or mass, of the bearing housing.

The bearing housing according to the disclosure therefore utilizes the cavities to provide a thermal break and improve the robustness and thermal performance of the bearing housing during operation.

Incorporation of the cavities in the first face also means that the cavities can be manufactured with relative ease. Specifically, due to the cavities being disposed in the first face, the cavities can be machined during manufacture of the bearing housing.

The cavities may be circumferentially distributed about the axis.

The cavities being circumferentially distributed may otherwise be described as the cavities forming a circular pattern about the mounting flange. The circumferential distribution may otherwise be a substantially circumferential distribution i.e. small deviations from a perfectly circumferential distribution are contemplated.

The circumferential distribution is advantageous because the mounting flange is likely annular. As such, the circumferential distribution of cavities means the cavities can be distributed evenly around the mounting flange.

The cavities may be arcuate.

The arcuate cavities may have a constant radius.

The cavities may otherwise be described as being semicircular. The constant radius may vary between cavities, or all cavities may share the same constant radius.

The constant radius of each of the plurality of cavities may be between around 10 mm and around 15 mm.

The constant radius may be around 13.5 mm, so as to provide a 27 mm diameter.

Cavities of the above geometries have been found to be particularly effective in improving thermal performance of the mounting flange. Furthermore, cavities having these geometries can readily be incorporated in existing mounting flange geometries, without necessitating more significant design changes.

The mounting flange may further comprise a circumferential peripheral lip.

The circumferential peripheral lip provides a further thermal mass which increases the thermal inertia of the mounting flange, making it more resistant to temperature change.

The circumferential peripheral lip may extend radially outwardly of a radially outermost point the first face by between around 1 mm and around 5 mm.

The circumferential peripheral lip preferably extends radially outwardly of the radially outermost point of the first face by around 2.5 mm.

Each of the plurality of bores may be in communication with a corresponding one of each of the plurality of cavities.

Alternatively, each of the plurality of bores may be in communication with multiple cavities, or vice versa.

A step of material may be disposed between a third face of the mounting flange, which opposes the first face on the other side of the mounting flange, and the body, the step of material spanning substantially circumferentially about the axis.

The step of material provides another thermal mass which increases the thermal inertia in the vicinity of the mounting flange.

The step of material may be between around 5 mm and around 15 mm in axial depth.

The step of material preferably extends around 10 mm in the axial direction.

A depth of the cavities may be between around 2 mm and around 5 mm.

Preferably the cavities are around 3 mm deep. That is to say, preferably the cavities are axially recessed, relative to the first face, by around 3 mm.

According to a second aspect of the disclosure there is provided a turbocharger comprising:

a. a compressor;
b. a turbine comprising the corresponding mounting flange according to the first aspect of the disclosure; and
c. the bearing housing according to the first aspect of the disclosure, the bearing housing being connected to the compressor at one end and the turbine at the other end.

The turbine may be a dual-inlet or twin-volute turbine. Alternatively, the turbine may be a single-inlet turbine. The turbine may be a variable geometry turbine. The turbocharger may be a fixed geometry turbocharger. The turbocharger may be a variable geometry turbocharger. The turbocharger may incorporate a wastegate. The turbine may incorporate a wastegate.

The turbocharger may form part of an engine arrangement. The engine arrangement may form part of an automotive vehicle such as an automobile. More specifically, the vehicle may be a car, truck, bus, train or the like. The engine arrangement may be an internal combustion engine. Alternatively the turbocharger may form part of a static arrangement, such as a pump.

The corresponding mounting flange may have substantially the same outer diameter as that mounting flange of the bearing housing. Alternatively, the geometries may be different.

Fasteners may be used to secure the mounting flange of the bearing housing to the corresponding mounting flange of the turbine housing, the fasteners being inserted through only some of the bores of the mounting flange of the bearing housing.

The fasteners may be bolts. The bolts may pass through, or penetrate, clearance bores in the mounting flange and be received by threaded bores in the turbine housing. The bolts may pass through, or penetrate, the cavities.

The mounting flange of the bearing housing may comprise 2n bores, and the corresponding mounting flange of the turbine housing comprises n bores, and wherein n, or fewer, fasteners are distributed between the 2n bores of the mounting flange of the bearing housing, and pass therethrough, into the n, or fewer, bores of the corresponding mounting flange of the turbine housing to secure the turbine housing to the bearing housing.

In other words, there may be more bores provided in the mounting flange than are required, or are present, in the turbine housing. This provides for rotational adjustment of the turbine housing relative to the mounting flange, and so bearing housing. This is particularly useful when a model of turbocharger is used in a variety of different engine architectures, and it may be desirable to be able to adjust the relative orientations thereof.

According to a third aspect of the disclosure there is provide a bearing housing for a turbocharger, the bearing housing comprising:
a. a body configured to receive one or more bearings, the one or more bearings being configured to support rotation of a shaft about an axis; and
b. a mounting flange, the mounting flange extending around the body and comprising:
  i. a first face configured to engage a corresponding mounting flange of a turbine housing; and
  ii. a plurality of cavities, the plurality of cavities being axially recessed relative to the first face;
c. wherein the mounting flange is configured to be engaged by a V-band clamp.

V-band clamps are known attachment means. V-band clamps typically extend circumferentially, and incorporate a recess or cavity in which two bodies, or portions thereof, are received. Upon tightening the V-band clamp, the bodies, or portions thereof, are drawn together and are thereby secured to one another.

V-band clamps can be secured in a single operation.

The mounting flange may be configured to be engaged by a V-band clamp by being of a specific dimension, having a specific outer geometry or having a specified surface finish. For example, in being able to be engaged by a V-band clamp, the mounting flange may require an accessible outer surface and/or a tapered face, A narrow edge may also be utilized so that the V-band clamp can "hook" over the edge.

The engagement may be direct or indirect. Bores for receipt of fasteners are not considered to be cavities as defined in the claims.

According to a fourth aspect of the disclosure there is provide a turbocharger comprising:
a. a compressor;
b. a turbine comprising the corresponding mounting flange according to the third aspect of the disclosure;
c. a bearing housing according to the third aspect of the disclosure, the bearing housing being connected to the compressor at one end and the turbine at the other end.

The turbocharger may further comprise a V-band clamp configured to secure the mounting flange of the bearing housing to the corresponding mounting flange of the turbine housing.

According to a fifth aspect of the disclosure there is provided a method of manufacturing the bearing housing of the first or third aspects of the disclosure, the method comprising the steps of:
i) casting the bearing housing; and
ii) machining the first face of the bearing housing.

The first face of the bearing housing, specifically the first face of the mounting flange thereof, may be machined by way of milling or spot-facing. This may be to smooth an otherwise rough surface, in order to achieve a required surface finish. The machining may also flatten the first face so as to provide a uniformly flat, or substantially flat, surface for engagement with the corresponding mounting flange of the turbine housing.

The bearing housing may be cast from any suitable material. Suitable examples include grey cast iron and associated variants.

Step i) may comprise creating the cavities by casting.

Creating the cavities by casting is advantageous because, although the mould requires modification accordingly, the cavities are created at the same time as the rest of the bearing housing is. This is likely cheaper, in the long run, and negates the need to machine each individual cavity, for each bearing housing produced.

Step ii) may comprise creating the cavities by machining the first face.

Creating the cavities by machining means that the mould need not be modified, and avoids potential issues with uneven cooling rates of the body during casting. Given that the cavities may need to be machined regardless (i.e. in order to achieve required tolerances and/or surface finishes), machining the cavities in order to create them may also mean manufacture is quicker, owing to creating and finishing the cavities using the same machining process.

The method may further comprise the step of machining the plurality of bores.

The bores may be machined after the cavities are machined.

According to a sixth aspect of the disclosure there is provide a bearing housing for a turbocharger, the bearing housing being manufactured from Silicon Molybdenum SG Iron.

Silicon Molybdenum SG Iron provides desirable heat-resistant properties and thermal cycling performance. Silicon Molybdenum SG Iron also has comparably lower manufacturing costs than heat-resistant steels, and therefore offers good value in terms of part manufacturing cost. Silicon Molybdenum SG Iron is also a highly castable material, which allows for complex geometries and features to be cast therefrom. Silicon Molybdenum SG Iron is also readily machined, which is desirable for manufacture.

When a bearing housing is created using Silicon Molybdenum SG Iron, the bearing housing therefore incorporates all of the above desirable properties. This results in a more cost effective, and better performing, bearing housing.

This aspect of the disclosure may be combined with any previous aspects of the disclosure to provide further improvements in performance.

According to a seventh aspect of the disclosure there is provided a bearing housing fora turbocharger, the bearing housing comprising:
a. a body configured to receive one or more bearings, the one or more bearings being configured to support rotation of a shaft about an axis; and
b. a mounting flange, the mounting flange extending around the body and comprising:
  i. an attachment portion configured to secure the bearing housing to a corresponding attachment portion of a turbine housing;
  ii. an alignment portion comprising a first face configured to engage, directly or indirectly, a corresponding alignment portion of the turbine housing; and
  iii. one or more cavities formed in the first face.

The one or more cavities are disposed in the alignment portion. The one or more cavities are axially recessed relative to the first face. The one or more cavities may be described as recesses.

The incorporation of the one or more cavities increases the thermal resistance at the interface between the alignment portions of the bearing housing and the turbine housing. In other words, the one or more cavities assist in thermally decoupling the respective alignment portions. This results in reduced heat transfer from the turbine housing to the bearing housing. Reduced heat transfer, from the turbine housing to the bearing housing, is desirable because the bearing housing may fail prematurely due to excessive temperatures.

The one or more cavities may define an outermost part of the alignment portion. In other words, the one or more cavities may define an exterior of the bearing housing. The one or more cavities may be said to communicate with an exterior portion of the bearing housing.

Advantageously a gap can be provided between the attachment portions. The attachment portion provides an attachment functionality. The alignment portion provides an alignment functionality.

The attachment portions may utilize bores, for a bolted connection, or a V-band clamp.

Optional features of the first aspect of the disclosure, and any aspect of the disclosure referring to the first aspect of the disclosure are also applicable to this aspect of the disclosure.

The optional and/or preferred features for each aspect of the disclosure set out herein are also applicable to any other aspects of the disclosure, where appropriate.

BRIEF DESCRIPTION OF THE DRAWINGS

Specific embodiments of the present disclosure will now be described, by way of example only, with reference to the accompanying drawings in which:

FIG. 1b is a magnified view of a region of interest of the turbocharger of FIG. 1a;

FIGS. 2a-d are various views of the bearing housing of the turbocharger of FIG. 1a;

FIG. 4 is a table which summarizes computational modeling results of the thermal performance of the bearing housing of FIGS. 2a-d, in accordance with an embodiment of the disclosure, in comparison to a conventional design of bearing housing, such as that illustrated in FIGS. 3a-c;

FIG. 5 is a table which summarizes the fatigue performance of the bearing housing of FIGS. 2a-d in comparison to a conventional design of bearing housing as shown in FIGS. 3a-c;

DETAILED DESCRIPTION OF EMBODIMENTS OF THE DISCLOSURE

Figure 1A:
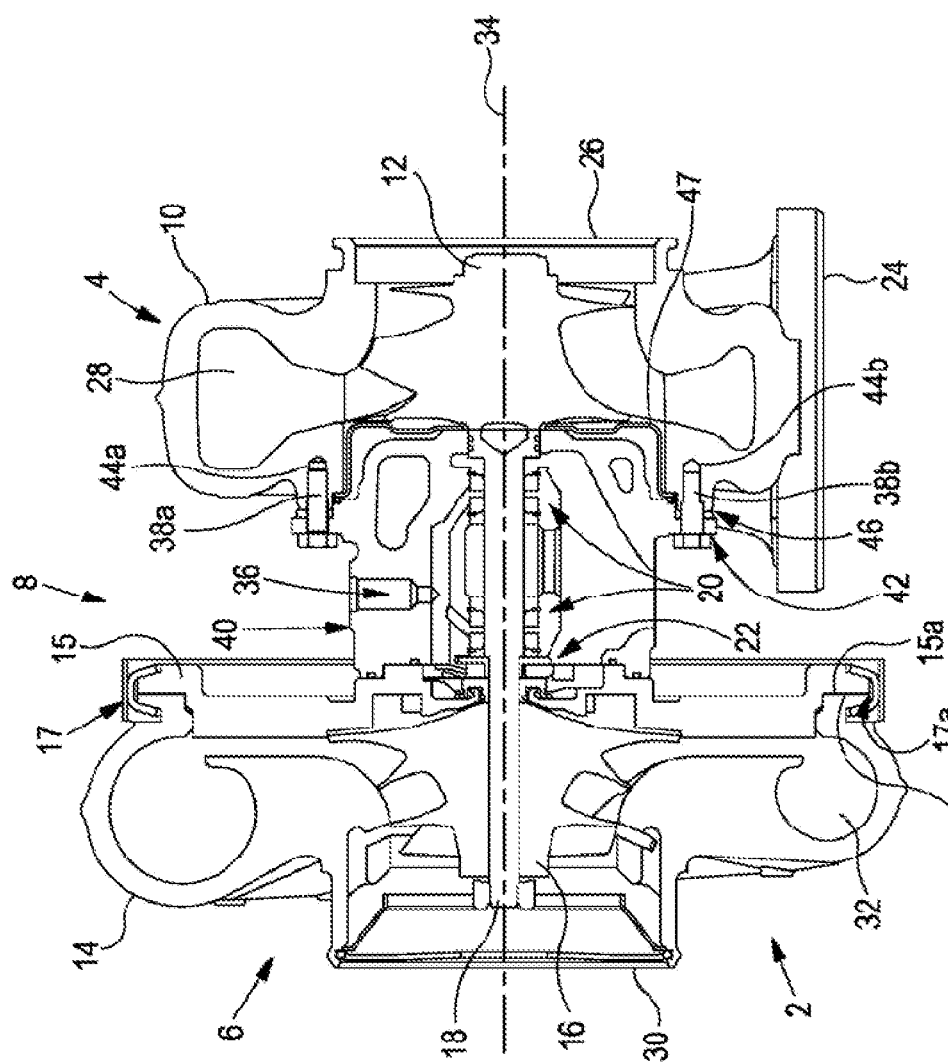
FIG. 1a is a cross-sectional side view of a turbocharger, incorporating a bearing housing according to an embodiment of the disclosure.

FIG. 1a is a cross-sectional side view of a turbocharger 2 according to a second aspect of the disclosure.

The turbocharger 2 comprises a turbine 4 joined to a compressor 6 via a bearing housing 8. The bearing housing 8 is an embodiment of the first aspect of the disclosure. The turbine 4 comprises a turbine housing 10 and a turbine impeller 12. The compressor 6 comprises a compressor housing 14, compressor backplate 15 and a compressor impeller 16. The turbine impeller 12 and compressor impeller 16 are mounted on opposite ends of a shaft 18 which is supported on roller bearing assemblies 20 and a thrust bearing assembly 22 within the bearing housing 8. The roller bearing assemblies 20 support a predominantly rotational load whilst the thrust bearing assembly 22 supports a predominantly axial load. The compressor housing 14 is secured to the compressor backplate 15 by a V-band clamp 17.

Although a fixed geometry turbocharger is shown in FIG. 1, the disclosure is equally applicable to a variable geometry turbocharger. Similarly, whilst a single volute turbine is illustrated, the disclosure may be used with a twin-volute turbine.

The turbine housing 10 is provided with an exhaust gas inlet 24 and an exhaust gas outlet 26. The exhaust gas inlet 24 directs incoming exhaust gas to an annular inlet chamber 28 surrounding the turbine impeller 12. The exhaust gas flows through the turbine 4 and out of the exhaust gas outlet 26 via a circular outlet opening which is coaxial with the turbine impeller 12. Rotation of the turbine impeller 12 rotates the compressor impeller 18 which draws in air through axial inlet 30 and delivers compressed air to the engine intake via an annular volute 32. A compressor outlet, downstream of the annular volute 32, is not shown in the cross-section view of FIG. 1a. The turbine impeller 12, shaft 18 and compressor impeller 16 are coaxial and rotate about a turbocharger axis 34.

Of particular relevance to the present disclosure is the bearing housing 8.

The bearing housing 8 provides a lubricating system for the turbocharger 2. The bearing housing 8 includes a series of channels 36 through which oil is supplied to the roller bearing assemblies 20 and thrust bearing assembly 22. The channels 36 receive oil from an engine oil circuit (not shown).

As well as providing the lubricating system, the bearing housing 8 also provides a means of securing the compressor 6 and the turbine 4 relative to one another. In FIG. 1a, and as mentioned above, the compressor housing 14 is secured to the compressor backplate 15 by way of the V-band clamp 17. As can be seen in FIG. 1a, the V-band clamp provides a V-like recess 17a in which respective flanges 14a, 15a of the compressor housing 14 and compressor backplate 15 are received. Once the flanges 14a, 15a are aligned as shown in FIG. 1a, the V-band clamp 17 is tightened so as to draw the respective flanges 14a, 15a together. The compressor housing 14 is thereby secured to the compressor backplate 15.

The compressor backplate 15 is attached to the bearing housing 8. However, in FIG. 1a said attachment is not visible due to the plane through which the cross section of FIG. 1a is taken. Fasteners, such as bolts, are received from the compressor 6 end of the compressor backplate 15 through bores in the compressor backplate 15 (not shown in FIG. 1a). The threaded ends of said fasteners are then received in corresponding threaded bores of the bearing housing 8 (said threaded bores also not being visible in FIG. 1a).

The compressor backplate 15 is, during assembly of the turbocharger 2, attached to the bearing housing 8 before the compressor housing 14 is attached to the compressor backplate 15. This order of assembly allows the compressor impeller 16 to be inserted axially along the shaft 18 before the compressor housing 14 is then placed over the compressor impeller 16. This would not be possible otherwise, owing to the geometry of the compressor housing 14 relative to the compressor impeller 16.

The V-band clamp 17 is a known attachment means in a turbocharger and is useful for reasons of low cost, a low number of operations required to attach the components together, and for providing a sufficiently secure attachment between the components.

At the turbine 4 end of the bearing housing 8, a different attachment means is used to secure the turbine 4 to the bearing housing 8. As shown in FIG. 1a, fasteners 38a, 38b are used to secure the turbine 4, specifically the turbine housing 10 thereof, to the bearing housing 8. Although only two fasteners 38a, 38b are shown in FIG. 1a, these fasteners are only some of a higher number of fasteners distributed about the axis 34. FIGS. 2a-d provide a better indication of the number, and arrangement, of fasteners which may be used.

In order to specify the way in which the turbine housing 10 is attached to the bearing housing 8, the bearing housing 8 is defined as comprising a body 40 and a mounting flange 42. The body 40 and flange 42 are integrally formed as a single unit. The body 40 defines most of the bearing housing 8, and it is in the body 40 that the roller bearing assemblies 20 and the thrust bearing assembly 22 are received. The mounting flange 42 extends around the body 40. That is to say, the mounting flange 42 at least partly surrounds the body 40.

Various features will be discussed in greater detail below in connection with FIG. 1b, which is a magnified view of the mounting flange 42 and the fastener 38a of the FIG. 1a arrangement.

Referring to FIG. 1a, the fasteners 38a, 38b are used to secure the turbine 4 to the bearing housing 8. The fasteners 38a, 38b pass through, or are received by, corresponding bores in the mounting flange 42. The bores are not clearly visible in FIG. 1a, but it will be appreciated that the bores are implicitly indicated by the presence of the fasteners 38a, 38b through the mounting flange 42. The bores through which the fasteners 38a, 38b pass in the mounting flange 42 are clearance holes. That is to say, the bores are not threaded and simply allow the fasteners 38a, 38b to pass therethrough. Corresponding bores 44a, 44b in the turbine housing 10 are threaded and the fasteners 38a, 38b, specifically threaded portions thereof, are received therein. It is noted that the threads of the bores 44a, 44b, and threads of the threaded portions of the fasteners 38a, 38b, are not shown in FIG. 1a.

The fasteners 38a, 38b pass through the bores in the mounting flange 42, and are received by the threaded bores 44a, 44b of the turbine housing 10. The fasteners 38a, 38b are then tightened. As the fasteners 38a, 38b are tightened, threaded portions thereof engage, to a greater extent, with the threaded bores 44a, 44b of the turbine housing 10. As the fasteners 38a, 38b are tightened, the turbine housing 10 is drawn, or urged, into contact with the mounting flange 42 of the bearing housing 8. Specifically, a corresponding mounting flange 46 of the turbine housing 10 engages the mounting flange 42. This engagement, or abutment, is what defines the axial alignment of the turbine housing 10, and so the turbine 4, in relation to the bearing housing 8. That is to say, during assembly of the turbocharger 2, the turbine housing 10 is urged along the axis 34 towards the bearing housing 8. At the position whereby the mounting flange 46 of the turbine housing 10 abuts the mounting flange 42 of the bearing housing 8, the turbine housing 10 is axially located and cannot be moved any further in that axial direction. In other words, the combination of the mounting flanges 42, 46 defines a limit of axial travel of the turbine housing 10.

Also shown in FIG. 1a is a heat shield 47 which shields the bearing housing 8 from at least some of the high temperature exhaust gases which are expanded through the turbine 4 during operation of the turbocharger 2.

As mentioned above, during operation of the turbocharger 2 hot exhaust gases enter the exhaust gas inlet 24 of the turbine 4, pass through the annular inlet chamber 28 and are expanded through the turbine impeller 12. The exhaust gases then exit the turbine 4 via the exhaust gas outlet 26. It is the expansion of the hot exhaust gases which drives, or rotates, the turbine impeller 12, and so the compressor impeller 16, via the shaft 18. During operation, the exhaust gas temperatures can reach in excess of 1000° C. Due to the flow of the exhaust gases through the turbine 4, the turbine 4, specifically the turbine housing 10 thereof, increases in temperature due to heat transfer by way of convection. In turn, the increase in temperature of the turbine 4 can lead to an increase in the temperature of the bearing housing 8. Specifically, because the mounting flange 42 is in thermal communication with the corresponding mounting flange 46 of the turbine housing 10, the bearing housing 8 increases in temperature during operation of the turbocharger 2. Of particular concern during operation of the turbocharger 2 are stresses induced in the mounting flange 42 due to the temperature of the exhaust gases in the turbine 4.

Both mounting flanges 42, 46 expand and contract during operation of the turbocharger 2, but at different rates. This gives rise to thermal stresses in both mounting flanges 42, 46. Thermal stresses are also induced in the mounting flanges 42, 46 because the mounting flanges 42, 46 are constrained by the fasteners 38, 38b. The mounting flange 46 of the turbine housing 10 will expand and deform as its temperature increases, due to the hot exhaust gases. The mounting flange 42 of the bearing housing 8 will also, itself, expand and deform as it increases in temperature. The expansion and contraction may otherwise be referred to as deformation. The effects are worsened due to the turbocharger 2 being operated in a cyclical nature. That is to say, the turbocharger is operated for a period of time, and operation is then ceased for a period of time. Whilst the turbocharger 2 is operating, hot exhaust gases flow through the turbine 4 and increase the temperature of the surrounding components. Whilst the turbocharger is not operating, no hot exhaust gas flows through the turbine 4 and so the surrounding temperatures return to ambient temperatures. The aforementioned stresses are induced in the mounting flange 42, among other components, due to the increase in temperature by virtue of the hot exhaust gas flow. Given that this occurs in cycles, the cyclic operation of the turbocharger 2 can induce thermal fatigue failure in the mounting flange 42. This can, in turn, cause failure of the turbocharger 2.

Furthermore, the thermal fatigue in the vicinity of the mounting flange 42 can lead to a loss of the preload (the residual loading on a bolt when a torque is applied to the bolt, with the bolt engaging a threaded bore) of the fasteners 38a, 38b. That is to say, the fasteners 38a, 38b are gradually urged out of, and so away from, from the threaded bores 44a, 44b of the turbine housing 10. In essence, the fasteners 38a, 38b are urged away from the turbine housing 10, which can lead to the fasteners 38a, 38b gradually disengaging, or unthreading, from, the threaded bores 44a, 44b of the turbine housing 10. Eventually, a disconnection between the mounting flange 42 and the corresponding mounting flange 46 of the turbine housing 10 is risked if the preload loss continues to an unacceptable degree.

The present disclosure reduces the heat transferred from the exhaust gases, via the turbine 4, to the bearing housing 8 during operation of the turbocharger 2. The disclosure also reduces the thermal fatigue.

Figure 1B:
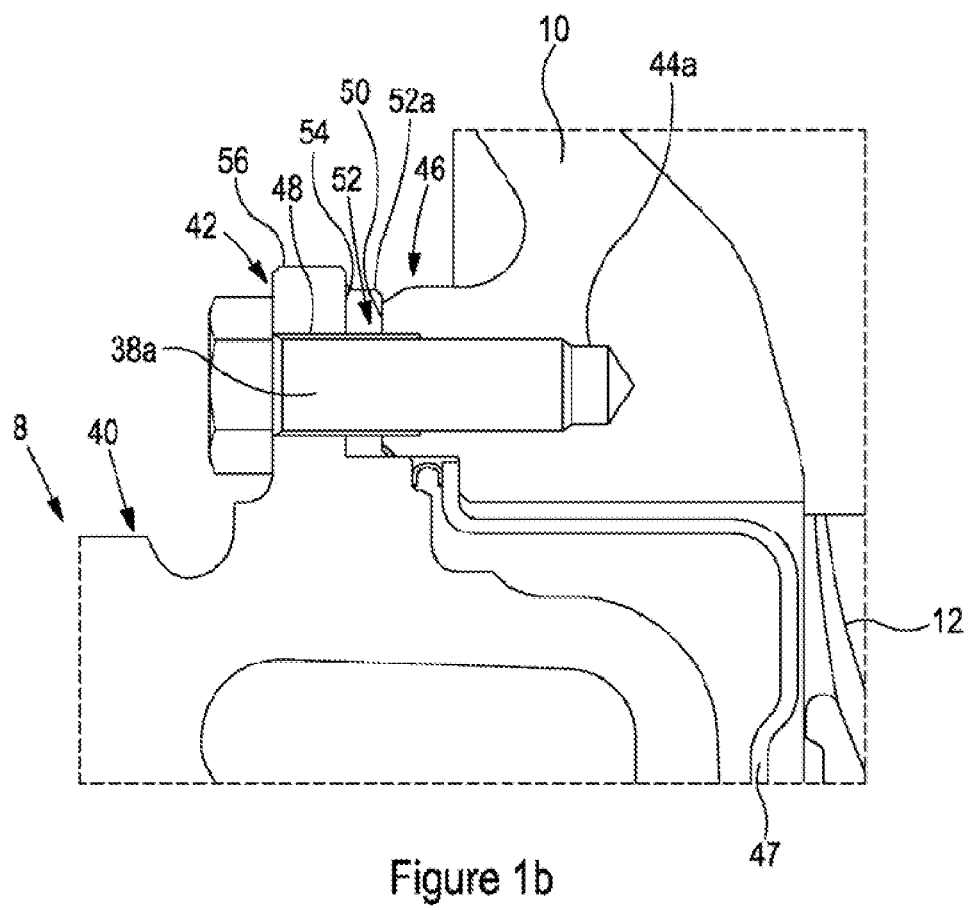

FIG. 1b is a magnified view of a region of interest of FIG. 1a. Features which were not visible in FIG. 1a are shown in FIG. 1b. Specifically, one bore of the mounting flange 42 is numbered as 48 and can be seen extending through the mounting flange 42. Furthermore, a clearance can be seen between an outer edge of a shank of the fastener 38a and an internal face of the bore 48. Also visible is the engagement of the corresponding mounting flange 46 of the turbine housing 10 and the mounting flange 42. Specifically, a first face 50 of the bearing housing mounting flange 42 engages the corresponding turbine housing mounting flange 46. The position of the heat shield 47 between the bearing housing 8 and the turbine housing 10 is more clearly indicated in FIG. 1b.

Moving on to discuss the specific features of the present disclosure, the bearing housing mounting flange 42 comprises a plurality of cavities 52 in communication with the plurality of bores 48. As shown in FIG. 1b, one such cavity 52 can be seen between the corresponding mounting flange 46 of the turbine housing 10 and a second face 54 of the mounting flange 42. In other words, the cavity 52 is defined between the first face 50 of the mounting flange 42 and the second face 54 of the mounting flange 42. The cavity 52 is also shown in various perspective views in FIGS. 2a to 2c.

Referring to FIGS. 1 and 2 together, the cavity 52 is one of a plurality of cavities which are circumferentially disposed around the mounting flange 42. That is to say, the plurality of cavities are distributed about the axis 34, about which the shaft 18, compressor impeller 16 and turbine impeller 12 rotate. There is one cavity 52 for each bore 48.

Each cavity 52 provides a thermal break between the second face 54 of the mounting flange 42 and the first face 50 of the mounting flange 42 of the bearing housing 8.

The plurality of cavities break a heat path for conduction of heat from the turbine housing 10 to the mounting flange 42 of the bearing housing 8. The plurality of cavities thereby reduce the temperature which is reached by the mounting flange 42 during operation of the turbocharger 2. This is desirable because thermal fatigue is worsened at increased temperatures of the material. Furthermore, stresses are increased at higher temperatures because the material has a coefficient of thermal expansion which leads to greater expansion/deformation of the material at higher temperatures. Similarly, at higher temperatures there is greater deformation of the turbine housing 10 and so mounting flange 46 thereof. This also contributes to increased stresses in the mounting flange 42 of the bearing housing 8, the mounting flanges 42, 46 being engaged with one another. Summarized, the thermal break provided by the cavities 52 reduces the temperature reached by the mounting flange 42 during operation of the turbocharger 2, which is beneficial for reasons of improved performance.

The plurality of cavities are shown in perspective views in FIGS. 2a-c, and these figures will be described in greater detail below.

Returning to FIG. 1b, a further feature shown is that of a circumferential peripheral lip 56. The circumferential peripheral lip 56 forms part of the mounting flange 42 and defines a radially outermost portion of the mounting flange 42. It can be seen from FIG. 1b that the circumferential peripheral lip 56 projects radially outwardly of a radially outermost point 52a of the cavity 52. As such, a stepped geometry is formed between the circumferential peripheral lip 56 and the radially outermost portion 52a of the cavity 52. It also follows that the circumferential peripheral lip 56 extends radially outwardly of the first face 50, specifically a radially outermost point of the first face 50.

The circumferential peripheral lip 56 preferably is of uniform thickness. A uniform thickness is easier to manufacture and provides a more uniform thermal behaviour (i.e. a reduced likelihood of one region becoming particularly hot). Said thickness is preferably between around 3 mm and around 10 mm. A thickness of around 6 mm is preferred. The circumferential lip 56 preferably extends in line with the second face 54. That is to say, preferably the circumferential peripheral lip 56, or a face thereof, lies in the same plane as the second face 54. This is advantageous for reasons of being able to machine the second face 54 of the mounting flange 42 and circumferential lip 56 concurrently. A thickness associated with the second face 54 is preferably also between around 3 mm and 10 mm, particularly preferably around 6 mm. That is to say, preferably the associated thickness is the same as that of the circumferential peripheral lip 56. The "associated thickness" refers to a thickness of material between the second face 54 and an opposing third face 55 (see FIG. 2c) on the other side of the mounting flange 42.

The circumferential peripheral lip 56 is advantageous because the extra "lip" of material provides a greater volume through which heat from the turbine housing 10 can be conducted. That is to say, the increased volume provided by the circumferential peripheral lip 56 increases the thermal inertia of the mounting flange 42, meaning that the temperature is not increased as much during use for the turbocharger 2. In other words, the additional volume makes the mounting flange 42 more resistant to temperature change.

The extra "lip" of material of the circumferential peripheral lip 56 also provides a greater surface area through which heat can radiate.

The circumferential peripheral lip 56 may be particularly advantageous in reducing the stresses induced in bolt holes of the mounting flange 42 during turbocharger operation. This will be described in detail below.

FIGS. 2a-d show various perspective and cross sectional views of a bearing housing 8 according to the disclosure. The bearing housing 8 of FIGS. 2a-d largely corresponds with the bearing housing 8 of FIGS. 1a and 1b. However, the bearing housing 8 of FIGS. 1a and 1b does not incorporate a stepped portion of material 64 (explained below).

Figure 2C:
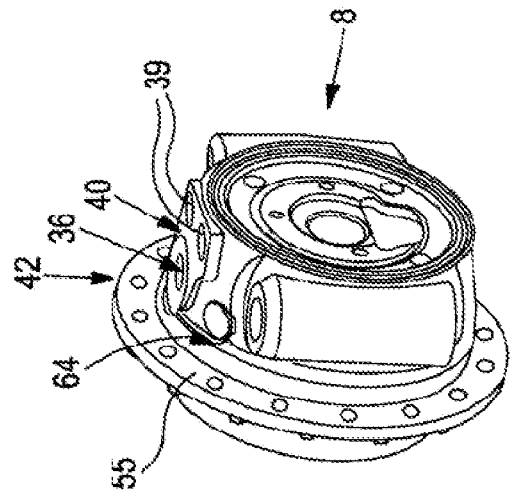
Figure 2D:
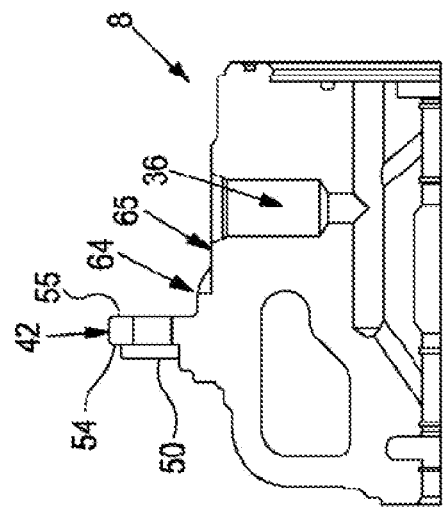
Figure 2A:
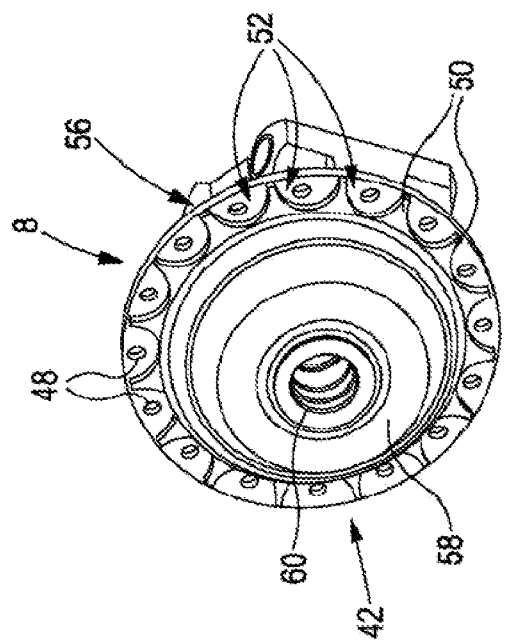

Beginning with FIG. 2a, a perspective view of the bearing housing 8 is provided from a turbine end. That is to say, when the turbocharger 2 is fully assembled, most of the portion of the bearing housing 8 which is visible in FIG. 2a is obscured by the turbine 4.

The dome 58 of the bearing housing 8 is visible in FIG. 2a. When the turbocharger 2 is assembled, and includes the bearing housing 8, it is the dome 58 which is adjacent the heat shield 47 (of FIGS. 1a and 1b). That is to say, the heat shield 47 (not shown in FIG. 2a) interposes the dome 58 and the turbine impeller 12. Also shown in FIG. 2a is orifice 60, through which the shaft (not visible in FIG. 2a) is received when the turbocharger 2 is assembled.

The perspective view of the bearing housing 8 in FIG. 2a more clearly demonstrates the arrangement of cavities 52 which form part of the mounting flange 42. In FIG. 2a an entire circumferential arrangement of cavities 52 are illustrated, with three such cavities being specifically indicated with the reference numeral 52. As will be observed, the circumferential arrangement is a continuous distribution about a circumference of the mounting flange 42. Put another way, the cavities 52 share the same geometry and are distributed at an equal radius from the axis 34 (not shown in FIG. 2a) of the turbocharger 2. Bores 48 are also shown in FIG. 2a, and will be described in more detail in connection with FIG. 2b.

The axially recessed nature of each of the cavities 52 relative to the first face 50 of the mounting flange 42 is also shown. The first face 50 may be formed of a number of separate faces as shown in FIG. 2a, and need not be a single, continuous face. However, the term first face 50 is intended to refer to the face, or collection of faces, that lie in a plane in facing relations with the mounting flange 46 of the turbine housing 10 in use. It is this plane or arrangement that allows the first face 50 to engage, indirectly or directly, with the corresponding mounting flange of the turbine housing.

As shown in FIG. 2a, the cavities 52 are arcuate. That is to say, each of the cavities is defined by a portion of a circumference of a circle, this portion being of a constant radius. The cavities 52 are generally semi-circular. Preferably, the constant radius is between around 10 mm and around 15 mm. In particularly preferable arrangements the constant radius is around 13.5 mm. It will be appreciated from FIG. 2a that an origin of the constant radius of each of the cavities 52 lies outside the mounting flange 42. That is to say, a centre point of a circle which defines each of the cavities 52 does not lie within the mounting flange 42. The radius of each of the cavities 52 may not be constant. That is to say, the radius may vary. Similarly, the radius may be constant across each individual cavity, or across all of the cavities i.e. all of the cavities may have the same radius. However, the radius may vary between cavities. It will be appreciated that the above features, describing specifics of the geometries of the cavities, are all optional features, and are not essential requirements of the disclosure.

The cavities 52 as illustrated in FIG. 2a, and described above, are advantageous in that the cavities 52 are of a relatively high volume. Cavities of the above geometries therefore provide a greater thermal break between the mounting flange 42 of the bearing housing 8 and, in use, a corresponding mounting flange of a turbine housing. Furthermore, the cavities 52 still provide for a ledge, or thickness, of material (defined at least in part by a first face, as described below), which provides alignment of the mounting flange of the turbine housing relative to the mounting flange 42 of the bearing housing 8. The cavity 52 geometries therefore provide a desirable balance of a high volume, and so good thermal break properties, whilst still providing an alignment feature to facilitate assembly of the turbocharger. The cavities 52 can also be manufactured using standard machining processes (described in more detail below).

Although constant radius cavities 52, the radius being uniform across the entire plurality of cavities, are illustrated, other geometries of cavities 52 may otherwise be used, as explained above. However, computational modeling of operation of the illustrated bearing housing 8 has shown the illustrated constant radius cavities 52 to be particularly effective. The results of the computational modeling will be described in greater detail below.

The cavities 52 remain generally empty after the turbocharger 2 is assembled. That is to say, other than for a bolt which may be inserted through a corresponding bore, no spacer or other component or material is disposed in the cavities 52.

Figure 2B:
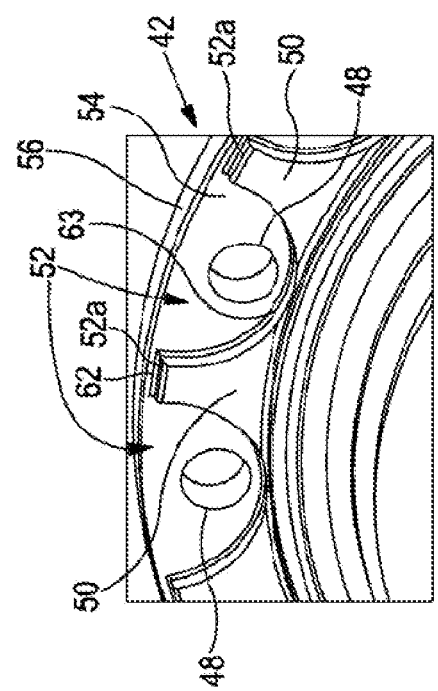

FIG. 2b is a close up view of the cavities 52 of the bearing housing 8 shown in FIG. 2a.

More clearly visible in FIG. 2b is an internal corner 62 defined between the first face 50 and the circumferential peripheral lip 56. Internal corner 62 is preferably filleted, as illustrated. A fillet radius of around 0.5 mm is preferred. A "sharp" corner, i.e. a non-filleted corner, can otherwise be a stress raising feature, which can facilitate the propagation of cracks, which is particularly problematic in fatigue wear mechanisms. As such, the filleted corner reduces stress concentration in that region, and reduces the likelihood of crack initiation, and subsequent propagation. This is beneficial for reasons of improved robustness, and better wear performance.

In order to further improve the fatigue performance of the mounting flange 42, specifically in the region of the circumferential peripheral lip 56, the area may be shot peened. Shot peening induces residual compressive stresses in the surrounding material area. Said residual compressive stresses reduce the effects of cyclic fatigue, improving the robustness of the mounting flange 42.

Circumferential peripheral lip 56 can also be seen to protrude, radially, beyond radially outermost point 52a of the cavities 52. As mentioned above, this radial increase in the material of the mounting flange 42 is beneficial for reasons of reduced stress and increased thermal inertia of the mounting flange 42, by virtue of there being a greater volume of material. The bores 48 of the mounting flange 42 are also shown in the circumferentially distributed arrangement.

FIGS. 2a and 2b both show the bores 48 of the mounting flange 42 and how the cavities 52 communicate with the bores 48. Specifically, the communication is intended to refer to an alignment of sorts whereby the bores 48 are disposed adjacent the cavities 52. That is to say, if fluid was to flow through the cavities 52, said fluid would also flow through the bores 48. The bores 48, in other words, pass through the cavities 52. The cavities 52 and bores 48 can also be said to be circumferentially aligned. The bores 48 are clearance bores. That is to say, as described in connection with FIG. 1b, fasteners, such as bolts, pass through the bores 48 and then engage threaded bores in the turbine housing when the turbocharger incorporating the bearing housing 8 is assembled. This is advantageous because heads of the fasteners are accessible from the bearing housing 8 side, but not the turbine housing side.

Although the cavities 52 are in communication with the bores 48, they are not necessarily concentrically aligned with one another. That is to say, the cavities 52 are distributed circumferentially about a first radius, and the bores are distributed circumferentially about a second radius. In the illustrated arrangement, the second radius is less than the first radius. That is to say, the bores 48 may or may not be concentrically aligned with the cavities 52. Similarly, in the illustrated arrangement there are an equal number of cavities 52 and bores 48. That is to say, there is a bore 48 associated with each cavity 52. However, there may be more, or fewer, bores 48 than cavities 52 in other arrangements.

As will be appreciated from FIGS. 2a and 2b, despite the presence of the cavities 52 the first face 50 still provides a face, or a surface, about which the bearing housing 8 can be aligned with the turbine housing 10. Specifically, the first face 50 defines a plane, and any features lying in that plane can engage, directly or indirectly, with a corresponding mounting flange of the turbine housing 10. This provides an axial alignment between the mounting flange 42 and the corresponding mounting flange 46, and more importantly between the bearing housing 8 and the turbine 4, This is achieved whilst still incorporating the cavities 52 which provide a thermal break to reduce the transfer of heat from the turbine housing 10 to the mounting flange 42 and so bearing housing 8. In other words, the cavities 52 go some way towards thermally isolating the mounting flange 42 from the comparatively hotter surfaces of the turbine housing 10, and corresponding mounting flange 46 thereof.

As has been mentioned already, these effects are assisted by virtue of the circumferential peripheral lip 56, which provides further material to resist the temperature change and distribute any thermal stresses. The circumferential peripheral lip 56 also provides a greater surface area through which head can radiate to reduce the temperature of the mounting flange 42.

The circumferential peripheral lip 56 extends radially outwardly of the first face 50, specifically a radially outermost point thereof, by between around 1 mm and around 5 mm in radius. That is to say, taken relative to a radially outermost point 52a of the cavity 52, and so the first face 50, the circumferential peripheral lip 56 radially extends, or projects, by between around 1 mm and around 5 mm. Preferably, the circumferential peripheral lip 56 extends by around 2 mm in radius.

A further feature which is shown in FIGS. 2c and 2d, but not in FIG. 1a or 1b, is that of a stepped portion of material 64. The stepped portion of material 64 may otherwise be referred to as a step of material, or the addition of a thermal mass. The stepped portion of material 64 preferably extends 360° around the bearing housing 8. That is to say, the stepped portion of material 64 preferably extends circumferentially around the body 40. The stepped portion 64 provides more material between the mounting flange 42 and the body 40 on the compressor side of the bearing housing. This increased amount, or volume, of material increases the thermal inertia, making the surrounding material (including the body 40) more resistant to temperature change. In other words, the stepped portion of material assists in reducing the temperature reached by the mounting flange 42 during turbocharger operation. Furthermore, the increased amount of material once again provides a greater area of material through which stresses can be distributed, thereby lowering peak stresses experienced during operation of the turbocharger. The stepped portion of material 64 preferably extends by between around 5 mm and around 15 mm in the axial direction, and more preferably around 10 mm. It is noted that said stepped portion of material 64 is not shown in FIG. 1a or 1b.

Adjacent the stepped portion of material 64, a flat region 65 is disposed. The flat region is disposed towards the compressor side of the bearing housing 8.

Also shown in FIGS. 2c and 2d are the series of channels 36 through which oil is supplied to the roller bearing assemblies during operation of the turbocharger. Of note, the roller bearing assemblies are not shown in FIG. 2d, but are shown in FIG. 1a, labeled 20. Also visible in FIG. 2c are bores 39, which may be used for mounting the bearing housing 8 to an engine or engine bay.

Figure 8:
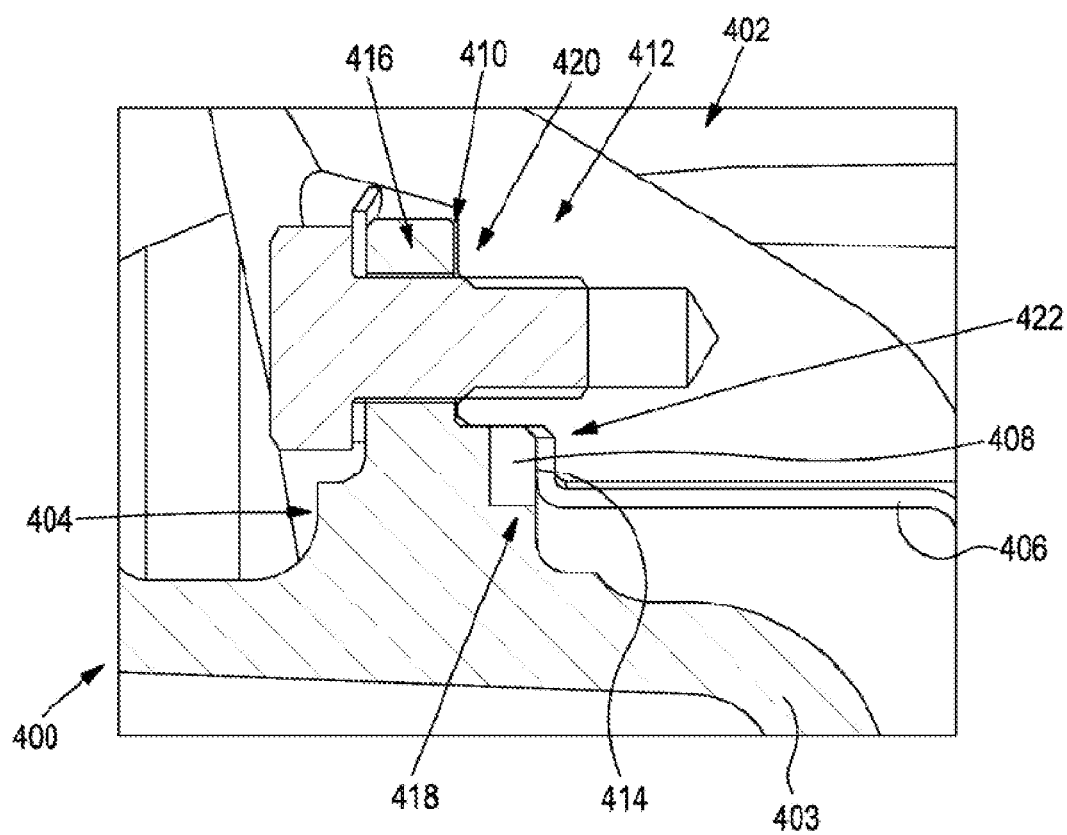
FIG. 8 is a cross-section view of part of a turbocharger assembly incorporating a different embodiment of bearing housing.

A different design of bearing housing is illustrated, in-situ and in cross-section, in FIG. 8.

FIG. 8 is a cross-section view of part of a turbocharger assembly incorporating a bearing housing 400 and turbine housing 402. Many features of the bearing housing 400 are shared with the bearing housing 8 illustrated in FIGS. 1a-2d. However, the mounting of the turbine housing 402 to the bearing housing 400 is different.

The bearing housing 400 of FIG. 8 comprises a body 403 and a bearing housing mounting flange 404. The mounting flange 404 extends around the body 403. A heat shield 406 is disposed between part of the mounting flange 404 of the bearing housing 400 and the turbine housing 402.

The mounting flange 404 comprises a plurality of cavities, one such cavity is visible and indicated with numeral 408. Like the cavities described in connection with the earlier embodiment, the cavity 408 provides a thermal break between the bearing housing 400 and the turbine housing 402. Although not visible from FIG. 8, the plurality of cavities may be circumferentially distributed like that shown in FIGS. 2a and 2b.

Unlike the earlier embodiment, there exists a gap 410 between a periphery of the mounting flange 404 and the turbine housing 402 (specifically mounting flange 412 thereof). The gap 410 is present to ensure that the heat shield 406 is securely retained between the mounting flange 404 of the bearing housing 400 and the mounting flange 412 of the turbine housing 402. The gap 410 may be, for example, around 0.25 mm.

In this embodiment, the mounting flange 404 of the bearing housing 400 can be defined as comprising an attachment portion 416 and an alignment portion 418. As suggested by the naming of these features, the attachment portion 416 aids in securing the bearing housing 400 to the turbine housing 402. Specifically, the attachment portion 416 is configured to secure the bearing housing 400 to a corresponding attachment portion 420 of the turbine housing 402. Similarly, the alignment portion 418 aids in aligning the bearing housing 400 relative to an alignment portion 422 of the turbine housing 402.

Given the above definitions, the gap 410 is disposed between the attachment portions 416, 420. Similarly, the heat shield 406 interposes the alignment portions 418, 422.

In the illustrated embodiment, the attachment portion 416 of the mounting flange 404 is disposed radially outwards of the alignment portion 418. The attachment portion 416 is also a distinct and separate portion of the mounting flange 404 to the alignment portion 418.

In the FIG. 8 embodiment, the alignment portion 418 of the bearing housing 400 comprises a first face 414. The first face 414 of the mounting flange 404 of the bearing housing 400 is therefore disposed closer to an axis of rotation of the turbocharger in this embodiment than in the previous embodiment (the first face is labeled 34 in FIG. 1). The first face 414 indirectly engages the alignment portion 422 of the turbine housing 402.

The heat shield 406 is sandwiched between, or retained between, the first face 414 of the alignment portion 418 of the bearing housing 400 and the corresponding alignment portion 422 of the turbine housing 402.

The cavities 408 are therefore still recessed relative to the first face 414. Furthermore, the cavities 408 directly depend from the first face 414. The cavities 408 could be said to be recessed into the first face 414, or formed in the first face 414.

Although the illustrated attachment portion 416 provides for a bolted connection, the arrangement can alternatively be used in combination with a V-band clamp. In such an embodiment, any bores, for receipt of fasteners therethrough, may be omitted from the attachment portion of the bearing housing.

Like the first embodiment, the second embodiment provides the desirable functionality that a thermal resistance, at an interface between the bearing housing 400 and the turbine housing 402, is increased. The bearing housing 400 is therefore thermally decoupled, to a greater extent, from the turbine housing 402. This results in reduced heat transfer from the comparatively hotter turbine housing 402 to the bearing housing 400 (and associated components housed therein). The cavities 408 can also be readily machined, owing to the cavities 408 being formed in the first face 414 and therefore externally exposed. Processes such as milling, like for the first embodiment, can therefore be used to manufacture the cavities 408.

Any optional features described in connection with the cavities of the first embodiment can also be used in combination with the second embodiment.

A "no gap" design, like that of the first embodiment, may be preferred for reasons of reduced bolt loosening and/or bolt cracking. A no gap design is intended to mean that there is no gap at the connection between, or between respective attachment portions of, the bearing housing and turbine housing.

Figure 3B:
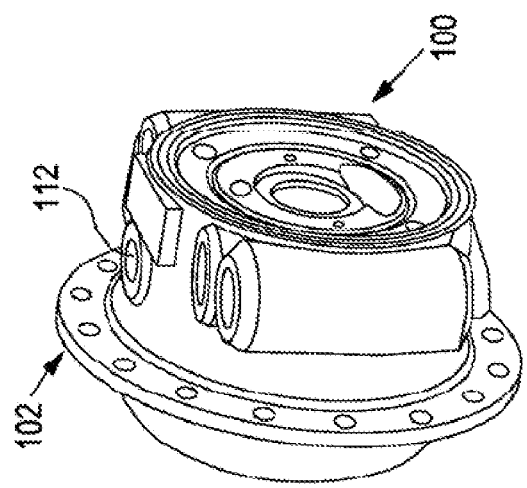
FIGS. 3a-c are various views of a conventional bearing housing.
Figure 3C:
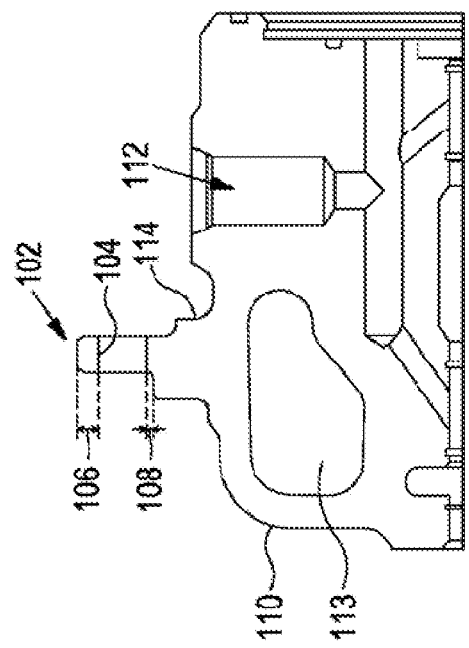
Figure 3A:
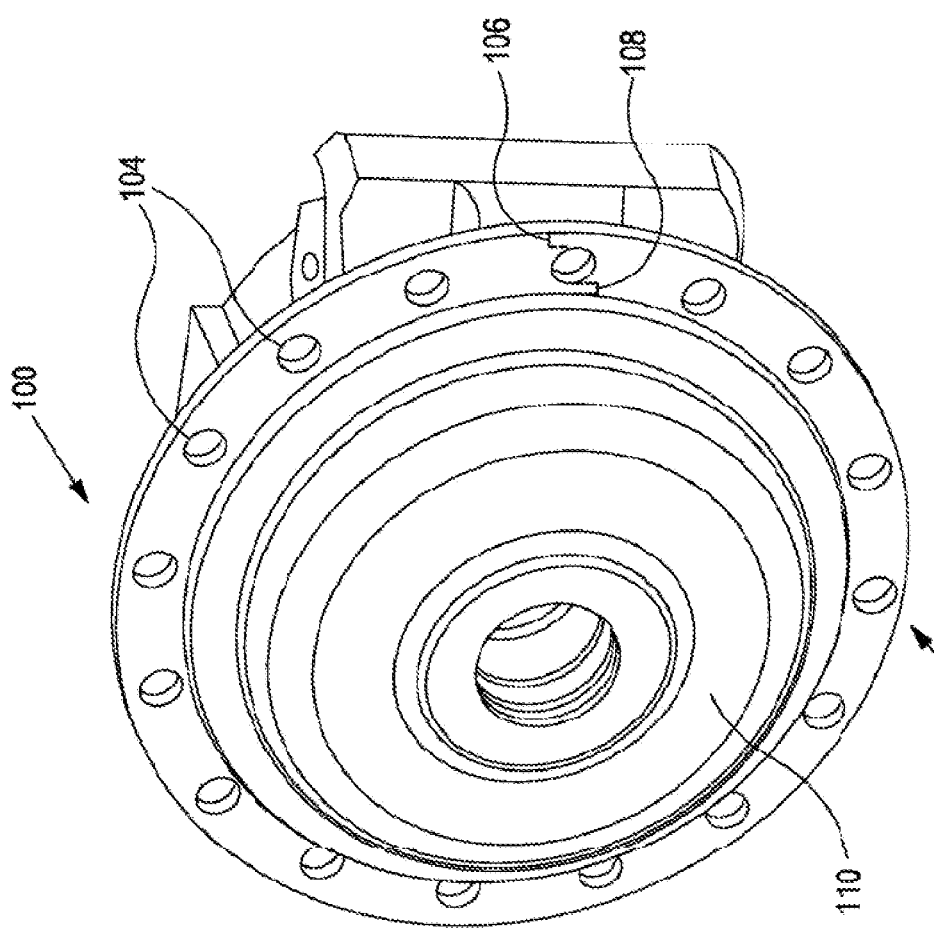

FIGS. 3a-c show a conventional bearing housing 100 design. As will be observed, the conventional bearing housing 100 also incorporates a mounting flange 102. However, the mounting flange 102 does not incorporate any cavities, or the circumferential peripheral lip, as described in connection with the bearing housing 8 according to the disclosure. Similarly, the bearing housing 100 does not incorporate the stepped portion of material.

As such, there are no features present to reduce the temperature reached by the mounting flange 102 in use and, as a result, the mounting flange 102 can experience excessive thermal stresses and may fail catastrophically, particularly by thermal fatigue. Regions which are particularly susceptible to such failures are the regions in proximity to the bores 104.

Due to the bores 104 extending through the mounting flange 102, a reduced thickness of material is present radially outwardly of each of the bores 104, and likewise radially inwardly of each of the bores 104. A first of these regions is a region of an outer diameter 106 i.e. the region between the bores 104 and an outermost diameter of the mounting flange 102. Another region is known as the dome side region 108, which is disposed between the dome 110 and the bores 104.

With a conventional bearing housing 100, cracks can propagate in either the outer diameter region 106, or the dome side region 108. In particular, if cracks propagate on the dome side 108, lubricant, such as oil, may leak from the bearing housing 100, which can lead to catastrophic failure due to a lack of lubrication of the roller bearings housed within. This is due, at least in part, to the proximity of the dome 110 to an internal cavity 113 (see FIG. 3c) through which lubricant flows during turbocharge operation. Similarly, crack propagation in the outer diameter region 106 can lead to a failure of the mounting flange 102 abutting the corresponding mounting flange of the turbine housing. This can lead to a leakage of exhaust gases through the gap provided therebetween, which can lead to low boost pressures. Furthermore, propagation of cracks in any region can lead to separation of the mounting flanges of the turbine and bearing housings respectively. This, in turn, can lead to a catastrophic failure of the turbocharger, i.e. a loss of primary function, if operation is continued.

As such, the disclosure provides a number of features which, when applied to a conventional bearing housing 100, provide improved thermal fatigue performance and reduce the temperatures experienced by the mounting flange 102 during operation of the turbocharger. Furthermore, this is achieved without significantly increasing the volume of material, and so associated cost of manufacture and weight, of the bearing housing.

Any variety of leakage or failure is clearly undesirable for reasons of reliability of the turbochargers in question. Furthermore, where warranties are offered as part of the turbocharger sale, leakage or failure also creates a financial burden upon the manufacturer. As such, it is desirable to improve the performance and/or reliability of the turbocharger for at least the above reasons.

It will also be observed that, in FIGS. 3a-c, there is no circumferential peripheral lip of the variety shown in FIGS. 2a to 2d. As such, there is less volume of material to contribute to the thermal inertia of the mounting flange, and to distribute the stress experienced by the mounting flange 102 in use.

FIG. 3b shows the bearing housing 100 in a different perspective view. As such, a series of channels 112, specifically openings thereof, are partly visible. Of note, there is no stepped portion of material in the bearing housing 100 of FIGS. 3a-c, unlike that shown in FIGS. 2c and 2d. This is particularly visible in FIG. 3c, which is a cross section view taken at the same position as that of FIG. 2d. Unlike the stepped portion of material 64 in FIG. 2d, FIG. 3c shows a trench 114, disposed between the compressor side of the mounting flange 102 and a main body portion of the bearing housing 100 (in which bearings are received). The trench 114 is incorporated for reasons of weight-saving i.e. material is removed to reduce the weight of the turbocharger. Due to the presence of the trench 114, a comparatively lower volume of material is present in the vicinity of the mounting flange 102 in FIG. 3c than is the case for FIG. 2d. This means that the thermal inertia of the mounting flange 102 is lower, and induced peak stresses would likely be higher, both contributing to reduced performance during turbocharger operation for the FIG. 3a-c bearing housing 100, relative to the bearing housing 8 shown in FIGS. 2a-d.

FIG. 3c also more clearly shows the other features, or specifically a lack thereof, relative to the bearing housing 8 as illustrated in FIG. 2d.

Although the illustrated and described arrangements thus far have only incorporated a mounting flange with a plurality of bores therein, for a bolted construction of bearing housing to turbine housing, the disclosure is also applicable for arrangements whereby a V-band clamp is used to secure the bearing housing to the turbine housing. In such arrangements, it may be the case that there are no bores present in the mounting flange, specifically through bores, due to the omission of any bolts. However, the circumferential arrangement of cavities may still be incorporated in a V-band clamp arrangement because the geometry is still effective in reducing the heat transfer from the turbine housing to the bearing housing. In other words, the geometry according to the disclosure still provides a thermal break between the mounting flange and the turbine housing, irrespective of how the two components are secured together.

It will be appreciated that minor modifications may be required to provide a flange which is engaged by a V-band clamp. An example of a V-band clamp is shown in FIG. 1a, although said V-band clamp 17 is used to secure the compressor housing 14 to the compressor backplate 15.

V-band clamps may be less preferable because V-band clamps may not be able to provide a clamp load which is as high as a comparable bolted construction. In a bolted arrangement, the clamp load is spread more evenly across the flange and can therefore provide a greater clamping load relative to a V-band clamp. Furthermore, bolts are cheap mechanical fasteners and their incorporation may therefore be comparatively cheaper than a V-band clamp, despite needing a higher number of bolts (i.e. in comparison to a single V-band clamp). However, whereas a bolted construction requires the fastening of each individual bolt, a V-band clamp can be secured in a single action, owing to the circumferentially extending nature of the V-band clamp.

Where a V-band clamp construction is used, equivalent cavities will not be exposed. That is to say, an otherwise externally exposed surface of the cavities (like that numbered 52a in FIG. 2b) will be covered by the V-band clamp.

The selection of a bolted construction or a V-band clamp may be determined by the vibration, or bending, which may be experienced by the flange in question. Furthermore, the choice of V-band clamp or bolted construction may be determined by the way in which the turbocharger is mounted within an engine or engine bay.

If the turbocharger is mounted by the turbine then a bolted construction may be used. This may be to facilitate supporting the mass of the turbocharger (which acts as a cantilever due to the offset mounting) and/or supporting external pipe loads and/or to reduce the effects of engine vibration. Alternatively, if the turbocharger is mounted by the bearing housing then a V-band clamp may be used instead. This may be because the mass of the turbocharger is more evenly distributed about the mounting, such that no significant cantilever effects are experienced. The above are just examples and are not intended to be limiting. Ultimately, the engine architecture may influence, dictate or necessitate the use of a V-band clamp or bolted construction in securing the turbine housing to the bearing housing. Similarly, there are advantages and disadvantages associated with using either a bolted construction or a V-band clamp.

Irrespective of whether a V-band clamp or bolted construction is used, the features of the present disclosure can be incorporated to improve the thermal performance of the turbocharger in question. Results of computational modeling of the bearing housing 8 according to the disclosure will be discussed in the section below, after manufacture of the cavities 52 is explained.

Typically, the bearing housing is manufactured by casting. That is to say, molten metal is poured into a mould, and allowed to cool to form the bearing housing. Typically, the bearing housing is cast from a variety of grey cast iron.

After the bearing housing is cast, some specific features of the bearing housing are machined to required tolerances and/or surface finishes. One such feature is the mounting flange.

The mounting flange is machined on the turbine side to produce a smooth surface finish, to a tolerance appropriate to allow the bearing housing and turbine housings to align as required. Similarly, the bores of the mounting flange are machined, by way of drilling or milling, and the surrounding surfaces are then machined to a suitable surface finish/tolerance.

According to the disclosure, the bearing housing also incorporates a plurality of cavities in the mounting flange. The bearing housing 8 according to the disclosure may have the cavities 52 created by machining or casting.

Manufacturing the cavities 52 by machining is advantageous in that machining already occurs for the bores 48. As such, no further tooling is required. Furthermore, machining does not necessitate changes to the mould used to cast the bearing housing 8, the moulds typically being extremely costly and difficult to modify. However, machining can be a slow process which inevitably adds cost to the manufacture of the bearing housing 8. Furthermore, where significant amounts of material are removed, as would be the case for the cavities 52, the time taken to complete the operation is increased even further.

Manufacturing the cavities 52 by casting is advantageous in that the cavities 52 can be formed with the rest of the bearing housing 8. As such, no further operation is required for each bearing housing 8 which is manufactured, once the mould is modified accordingly. However, and as mentioned above, modifying the mould can be costly, and care must be taken to avoid uneven amounts of material in the casting process, which can lead to material imperfections due to, for example, uneven cooling of different features.

Where the cavities 52 are manufactured by casting, further machining steps may be required in order to "clean up" the first and second faces 50, 54. That is to say, surrounding faces may require further machining in order to meet tolerancing and/or surface finish requirements, to name just some examples. Furthermore, machining processes may still be required in order to machine the bores 48 (that is, where the bores 48 are required i.e. in a bolted construction). Typically the bores 48 will be machined after the cavities 52 are machined.

Alternatively, the cavities 52 may be manufactured by casting without requiring further machining steps.

Machining processes may include milling; and spot facing, a specific variety of milling used to target specific areas.

It will be appreciated that the manufacturing process which is utilized to create the cavities 52 will affect the time taken to create the cavities, and the point at which the cavities are created. For example, if the cavities are created by machining, they will be created at a later point than if they were to be created by casting.

Moving on to discuss how the improvement in thermal performance of the bearing housing according to the disclosure is quantified, FIGS. 4 and 5 are tables in which a number of results are presented.

Beginning with FIG. 4, these results relate to computational modeling of the thermal performance of the conventional bearing housing design, in comparison to a bearing housing according to the disclosure.

The data relates to boundary conditions in which the bearing housings are "dry". That is to say, the bearing housings may or may not normally be cooled by lubricant flow, but for the purposes of the analysis the bearing housings are not cooled by lubricant flow. The use of "dry" bearing housings, as a boundary condition, therefore represents a "worst case" operating condition where thermal cracks are most likely to be observed. In other words, the "dry" boundary condition is a relatively harsh boundary condition most prone to inducing thermal cracks. For completeness, in use, thermal cracks are observed most frequently in dry bearing housings (i.e. bearing housings which are not cooled by lubricant flow). References to lubricant are also intended to include water (i.e. water-cooled bearing housings). Bearing housings which are normally cooled by lubricant flow may be used, in some applications, without a lubricant flow (i.e. a real-life "dry" condition).

The table shows how a combination of the design changes of the bearing housing according to the disclosure, and a material change, relative to the conventional bearing housing, mean that the Strength to Stress Ratio (SSR Ratio) of the new bearing housing is improved in all instances.

The SSR Ratio is a measure of design margin, and is equal to the strength of the material divided by the stress induced in the material. An SSR Ratio of >1 indicates that the proposed geometry is "design capable" i.e. the material can withstand the stress expected to be experienced in service.

An SSR Ratio of <1 indicates that the proposed geometry is not design capable, and that cracks can therefore be expected.

The "toward outer side of flange" and "toward dome side" refer to the positions indicated with the numerals 106 and 108 respectively in FIG. 3a. The "Turbine side"/"Comp side" variables refer to which side of the mounting flange the data is taken from. The "Open Hole area"/"Bolt hole area" refers to the fact that, in operation, only some of the bores of the mounting flange receive a bolt therethrough (for a bolted construction). Typically, there are twice as many bores in the mounting flange as there are threaded bores in the turbine housing, and so bolts used to secure them to one another. This is to allow the turbine housing to be rotated relative to the bearing housing, as required for different engine architectures, by vehicle manufacturers. As such, in a bolted construction, some bores will receive a bolt therethrough, whilst others remain empty.

As can be seen from the relevant portion of the table, all of the SSR Ratios for the bearing housing according to the disclosure are improved over those of the conventional design. Furthermore, all but one of the SSR Ratios are >1 and so would be design capable, even without cooling.

The table also indicates the maximum temperature reached by each of the bearing housings. It will be observed that the maximum temperature of the bearing housing according to the disclosure is considerably lower than that of the conventional bearing housing design. As described above, this is advantageous for reasons of reduced peak stresses and improved thermal performance.

Furthermore, owing to the difference in material choice, the temperature limit which the bearing housing according to the disclosure can sustain is also higher than the conventional design. As such, even if the temperatures weren't lower, the bearing housing according to the disclosure would be able to withstand the temperatures regardless. As is clear from FIG. 4, the temperature limit of the conventional bearing housing design, and conventional material selection, of 350-400° C., is exceeded in both open and bolt holes of the mounting flange. As such, thermal cracks would be expected to result in at least some instances.

FIG. 4 also alludes to the improved thermal fatigue performance of the bearing housing according to the disclosure over that of the conventional bearing housing. The fatigue performance is described in detail below, in connection with FIG. 5.

FIG. 5 is a summary table showing the fatigue performance of various features of the bearing housing according to the disclosure "With Slot Design" against the conventional design "Without Slot Design". The improvement attributed to the disclosure is also indicated in the right-handmost column, as a percentage.

The bearing housings used to produce the data from the table in FIG. 5 are made of the same material (silicon molybdenum SG iron). As such, the data in the table of FIG. 5 confirms that improvements in fatigue performance can be obtained with only a geometry change, as per the disclosure, and that a material change is not essential.

In the thermal fatigue simulation, the results of which are shown in FIG. 5, each fatigue cycle comprises:
 0.01 s cold steady state, wherein the temperature of the gas passing through the turbine housing is 160° C.;
 ~200 seconds of transient heating;
 0.01 s hot steady state, wherein the temperature of the gas passing through the turbine housing is 730° C.; and
 ~200 seconds of cooling.

In other words, each fatigue cycle includes a heating cycle which lasts ~200 seconds, and a cooling cycle which also lasts around ~200 seconds.

The steady state conditions applied in the simulation represent worst case scenarios. That is to say, the thermal conditions are, in use, unlikely to be as extreme as those used in the simulation.

A primary indication from FIG. 5 is that the disclosure greatly increases the fatigue life of the various geometric features in comparison to conventional bearing housing designs. This is quantified by the "% improvement" column, the improvements of which range from 519% to 4200%.

The table also shows that the feature "Fillet area near Rib region" sustained 51 cycles of fatigue. This feature is present by virtue of the cavities and, because there are no equivalent cavities in the conventional bearing housing design, there is no comparative data for the "Without Slot Design" entry. Briefly referring to FIG. 2b, the "Fillet area near Rib region" feature is the circumferentially extending "strip" of material between the first face 50 and the second face 54. Put another way, the combination of the circumferentially extending strip, the first face 50 and the second face 54 define each of the cavities 52. The "Fillet area near Rib region" is indicated by reference numeral 63 in FIG. 2b.

Although the fatigue life of the strip seems relatively low, it is still distinctly higher than the otherwise lowest fatigue life features of the conventional design. That is to say, whilst the value of 51 seems low, the region radially outwardly of the open holes in a conventional bearing housing design only withstood 9 fatigue cycles. Of note, it should be recalled that this testing is under "dry" conditions. That is to say, the simulations do not account for the cooling flow of lubricant which is otherwise circulated through the bearing housing. As such, these results merely provide a comparative indication of the relative fatigue performance between the two bearing housings, and their respective features.

As well as the aforementioned improvements in thermal fatigue performance, the disclosure is also advantageous in reducing a loss of "preload" in the bolts (in a bolted construction).

Preload, or clamp load, refers to the residual loading on a bolt when a torque is applied to the bolt, with the bolt engaging a threaded bore. Cyclic thermal loading, such as that in thermal fatigue, can lead to the loss of preload, owing to differences between expansion of surrounding materials. The difference in expansion can lead to the bolt being urged out of the bore, reducing the preload. Eventually, this risks the bolt disengaging the bore altogether, which can lead to catastrophic failure.

When an underside of the head of a bolt is flush with the facing surface, there is a small amount of preload.

Figure 6A:
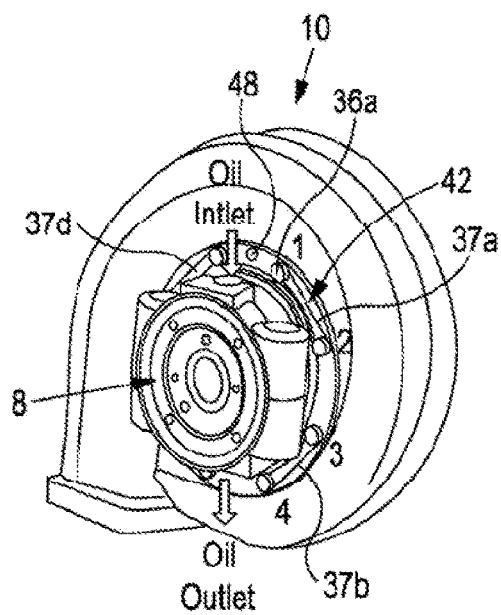
FIGS. 6a and 6b are perspective views of the bearing housing of FIGS. 2a-d, with a turbine housing attached thereto, with bolts numbered for reference.
Figure 6B:
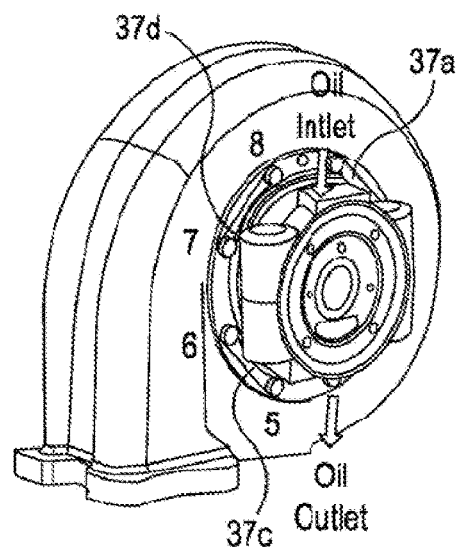

FIGS. 6a and 6b are two views of the bearing housing 8, according to the disclosure, with a turbine housing 10 attached thereto. Also illustrated in these figures is how there are more bores 48 in the mounting flange 42 of the bearing housing 8 than there are bolts 36a (only one of which is numbered in FIGS. 6a and 6b). This allows for rotational adjustment of the turbine housing 10 relative to the bearing housing 8, as required, depending upon the engine architecture. Also indicated are oil inlet and outlet channels, the oil inlet channel being numbered 36 in FIG. 1a.

In the illustrated arrangement there are eight bolts, and so eight bores in the turbine housing 10. There are 16 bores in the mounting flange 42. This allows the turbine housing 10 to be rotationally positioned, relative to the bearing housing 8, in increments of 22.5°. That is to say, only half of the bores in the mounting flange 42 receive boles therethrough, and the rest remain empty. It will be appreciated that more, or fewer, bolts and bores may be utilized in either of the mounting flange or turbine housing, but that a surplus of bores provides a means for rotational adjustment of the turbine housing relative to the bearing housing. Specifically, the greater the number of bores, in comparison to the number of bolts used, the greater the resolution to which the turbine housing 10 can be rotationally adjusted relative to the bearing housing 8. It may also be desirable to reduce the number of bolts used because, the more bolts that are used, the more time is required to assemble the turbocharger and associated costs are also therefore higher.

Each of the bolts are numbered 1-8 around the mounting flange 42. Also of note, four lock tabs 37a-d are present. The lock tabs 37a-d are sandwiched between an underside of heads of the bolts 36a and the mounting flange 42. Lock tabs 37a-d are utilized to reduce the loss of preload by reducing the likelihood of the bolts disengaging the threaded bores of the turbine housing 10 due to thermal expansion, vibration or corrosion.

Figure 7:
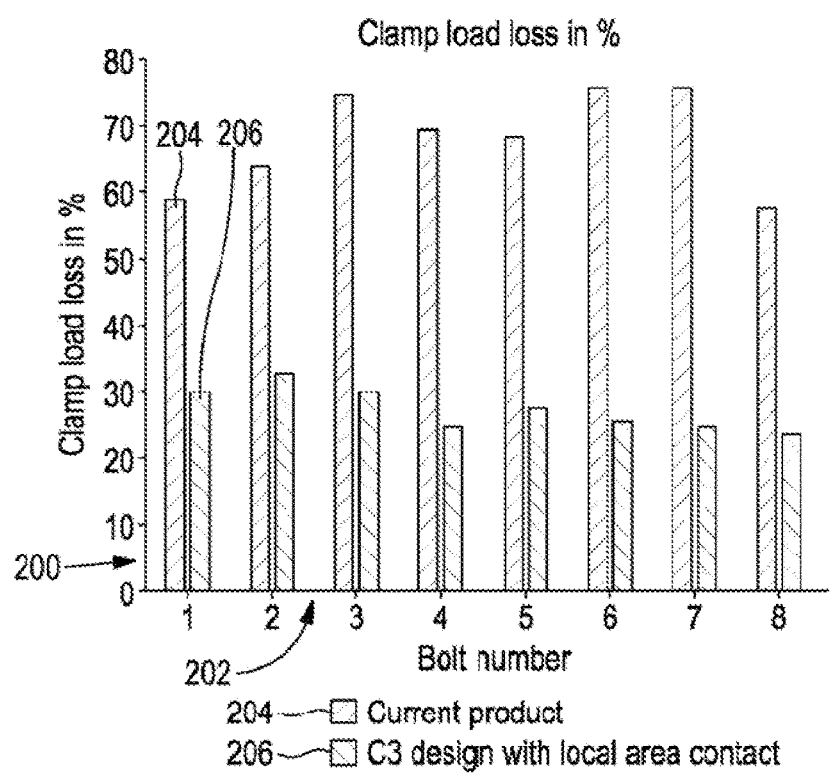
FIG. 7 is a graph showing clamp load loss for each of the bolts numbered in FIGS. 6a and 6b, as compared between the bearing housings of FIGS. 2a-d and FIGS. 3a-c respectively.

In the same simulation as described above in connection with FIGS. 4 and 5, the loss of preload of each of the bolts 1-8 is presented in FIG. 7. FIG. 7 is a bar chart which shows the loss of clamp load along the Y axis 200, and for each of the bolt positions 1-8 along the X axis 202, for both the conventional bearing housing design 204 and the bearing housing according to the disclosure 206.

As is shown in FIG. 7, and taking bolt position 1 as an example, the preload loss for the conventional bearing housing design is just under 60%, whilst the comparative preload loss for the bearing housing design according to the disclosure is around 30%. As such, the features according to the disclosure provide an improvement in reduction of preload loss, at bolt position 1, of a factor of two. In other words, at bolt position 1, the preload loss for a bearing housing according to the disclosure is distinctly lower than for the conventional design, resulting in an improvement in performance.

This is, at least in part, owing to the fact that the thermal expansion of the mounting flange of conventional bearing housing designs is relatively high, which leads to the bolts being "pulled out" to at least some extent. In the bearing housing design according to the disclosure, the modified mounting flange is much less prone to thermal expansion, owing to the various thermal-inertia increasing and temperature-reducing features. As such, the mounting flange according to the disclosure is less liable to undergo excessive thermal expansion, which could otherwise lead to a loss of preload of the bolts.

In the simulation, an initial "starting" preload is taken to be that applied during assembly of the turbocharger. That is to say, the initial preload corresponds with a torque setting applied to a torque wrench, or similar, used to tighten each of the bolts when the turbocharger is assembled.

The maximum preload loss with the conventional bearing housing design is equal to 76%, whilst the maximum preload loss for the bearing housing design according to the disclosure is around 33%.

In terms of the clamp load, the mounting flange being cooler offsets any loss of clamp load which may be attributable to the presence of the cavities (which represent a gap under a clamping face of the mounting flange). The gap could otherwise be said to lead to a "softer" bolted joint.

As such, the disclosure improves the thermal fatigue performance, and reduces the loss of preload associated with bolts, during operation of the turbocharger. In other words, the mounting flange SSR ratio is significantly improved, and a higher clamp load is maintained in the bearing housing according to the disclosure, in comparison to the conventional bearing housing design. As a result, the bearing housing according to the disclosure overcomes the crack propagation issues, i.e. formation of thermal cracks, which may otherwise be observed in conventional bearing housing designs, specifically the mounting flanges thereof.

The stepped portion of material, according to the disclosure, may be created owing to a casting change i.e. a change in the mould used to case the bearing housing. Similarly, the circumferential peripheral lip may be created owing to a casting change. The cavities may be created by way of a change to the mounting flange, which may be by virtue of a casting change, or by machining, as described above.

It will be appreciated that each of the cavities, circumferential peripheral lip and stepped portion of material contribute to an improvement in thermal performance of the bearing housing according to the disclosure. However, the cavities make the most significant difference, with the stepped portion, for example, improving the thermal performance by a margin of the order of 5-10%.

Where more material is incorporated in a body, it will be appreciated that the increase in material increases the thermal inertia of the body, making the body more resistant to temperature change. Furthermore, increasing the amount of material means that any heat transferred to the body is conducted away from the body more quickly than would otherwise be the case. This may be because there is more surface area available for heat transfer.

In terms of specific heat transfer processes, convection heating owing to the bulk movement of hot exhaust gas through the turbine housing will occur during operation. Furthermore, there will be conduction of heat from the turbine, and so turbine housing, and the mounting flange of the bearing housing. Radiative heat transfer will also occur.

Fasteners include bolts. Bolts are a specific example of a fastener.

As well as the geometric changes to the bearing housing, specifically mounting flange thereof, a further improvement has been found by way of altering the material from which the bearing housing is manufactured.

Typically the bearing housing is manufactured from grey cast iron. However, the applicant has identified advantages resulting from manufacturing the bearing housing from Silicon Molybdenum SG Iron.

Advantages associated with manufacturing the bearing housing from Silicon Molybdenum SG iron include:

Improved heat-resistant characteristics;

Better performance in thermal cycling scenarios (particularly thermal fatigue);

Improved manufacturability; and

Reduced costs compared to the use of heat-resistant steels.

The described and illustrated embodiment is to be considered as illustrative and not restrictive in character, it being understood that only preferred embodiments have been shown and described and that all changes and modifications that come within the scope of the disclosures as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims.

The invention claimed is:

1. A bearing housing for a turbocharger, the bearing housing comprising:
    a body configured to receive one or more bearings, the one or more bearings being configured to support rotation of a shaft about an axis; and
    a mounting flange, the mounting flange extending around the body and comprising:
        a plurality of bores configured to receive a fastener therethrough;
        a first face configured to engage a corresponding mounting flange of a turbine housing; and
        a plurality of cavities in communication with the plurality of bores, the plurality of cavities being axially recessed relative to the first face.

2. The bearing housing of claim 1, wherein the cavities are circumferentially distributed about the axis.

3. The bearing housing of claim 1, wherein each of the plurality of bores is in communication with a corresponding one of each of the plurality of cavities.

4. The bearing housing of claim 1, wherein a depth of the cavities is between around 2 mm and around 5 mm.

5. The bearing housing of claim 1, wherein the cavities are arcuate.

6. The bearing housing of claim 5, wherein the arcuate cavities have a constant radius.

7. The bearing housing of claim 6, wherein the constant radius of each of the plurality of cavities is between around 10 mm and around 15 mm.

8. The bearing housing of claim 1, wherein the mounting flange further comprises a circumferential peripheral lip.

9. The bearing housing of claim 8, wherein the circumferential peripheral lip extends radially outwardly of a radially outermost point the first face by between around 1 mm and around 5 mm.

10. The bearing housing of claim 1, wherein a step of material is disposed between a third face of the mounting flange, which opposes the first face on the other side of the mounting flange, and the body, the step of material spanning substantially circumferentially about the axis.

11. The bearing housing of claim 10, wherein the step of material is between around 5 mm and around 15 ram in axial depth.

12. A turbocharger comprising:
    a compressor;
    a turbine comprising the corresponding mounting flange as specified in claim 1; and
    the bearing housing according to claim 1, the bearing housing being connected to the compressor at one end and the turbine at the other end.

13. The turbocharger according to claim 12, wherein fasteners are used to secure the mounting flange of the bearing housing to the corresponding mounting flange of the turbine housing, the fasteners being inserted through only some of the bores of the mounting flange of the bearing housing.

14. The turbocharger according to claim 13, wherein the mounting flange of the bearing housing comprises 2n bores, and the corresponding mounting flange of the turbine housing comprises n bores, and wherein n, or fewer, fasteners are distributed between the 2n bores of the mounting flange of the bearing housing, and pass therethrough, into the n, or fewer, bores of the corresponding mounting flange of the turbine housing to secure the turbine housing to the bearing housing.

15. A bearing housing for a turbocharger, the bearing housing comprising:
    a body configured to receive one or more bearings, the one or more bearings being configured to support rotation of a shaft about an axis; and
    a mounting flange, the mounting flange extending around the body and comprising:
        a first face configured to engage a corresponding mounting flange of a turbine housing; and
        a plurality of cavities, the plurality of cavities being axially recessed relative to the first face;
    wherein the mounting flange is configured to be engaged by a V-band clamp.

16. A turbocharger comprising:
    a compressor;
    a turbine comprising the corresponding mounting flange as specified in claim 15;
    a bearing housing according to claim 15, the bearing housing being connected to the compressor at one end and the turbine at the other end.

17. The turbocharger according to claim 16, further comprising a V-band clamp configured to secure the mounting flange of the bearing housing to the corresponding mounting flange of the turbine housing.

18. A bearing housing for a turbocharger, the bearing housing comprising:
    a body configured to receive one or more bearings, the one or more bearings being configured to support rotation of a shaft about an axis; and
    a mounting flange, the mounting flange extending around the body and comprising:
        an attachment portion configured to secure the bearing housing to a corresponding attachment portion of a turbine housing;
        an alignment portion comprising a first face configured to engage, directly or indirectly, a corresponding alignment portion of the turbine housing; and
        a plurality of cavities formed in the first face.

* * * * *